US012617298B2

(12) United States Patent
Kheraluwala et al.

(10) Patent No.: US 12,617,298 B2
(45) Date of Patent: May 5, 2026

(54) POWER DISTRICT ARCHITECTURE FOR A VEHICLE

(71) Applicant: Hamilton Sundstrand Corporation, Charlotte, NC (US)

(72) Inventors: Mustansir H. Kheraluwala, Lake Zurich, IL (US); Andrew D. Bellis, Rockford, IL (US); Michael J. Krenz, Roscoe, IL (US); Joshua C. Swenson, Rockford, IL (US); Kyle Stephen Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 841 days.

(21) Appl. No.: 17/888,062

(22) Filed: Aug. 15, 2022

(65) Prior Publication Data

US 2024/0051406 A1    Feb. 15, 2024

(51) Int. Cl.
*H02J 7/00* (2026.01)
*B60L 50/60* (2019.01)
(Continued)

(52) U.S. Cl.
CPC .............. *B60L 50/66* (2019.02); *B60L 50/64* (2019.02); *B60L 58/18* (2019.02); *B60W 10/08* (2013.01);
(Continued)

(58) Field of Classification Search
CPC .......... B60L 50/66; B60L 50/64; B60L 58/18; B60W 10/08; H02J 3/14; H02J 3/322; H02J 4/00; H02J 2310/48; B61C 3/00
(Continued)

(56) References Cited

U.S. PATENT DOCUMENTS 9,271,423 B2     2/2016 Krenz et al.
10,897,216 B2    1/2021 Liang
(Continued)

FOREIGN PATENT DOCUMENTS

WO     WO-2021129421 A1     7/2021

OTHER PUBLICATIONS

Partial European Search Report dated Feb. 2, 2024 in connection with European Patent Application No. 23191465.6, 11 pages.
(Continued)

*Primary Examiner* — Zixuan Zhou

(57)     ABSTRACT

In accordance with at least one aspect of this disclosure, a power system for a vehicle is disclosed. The system can include, one or more power distribution sources configured to supply electrical power to one or more power districts. One or more power conversion devices can be housed within a respective power district. In embodiments, the power district can be configured to allow for managing a draw by a respective one or more loads within the respective power district. The one or more power conversion devices can be configured to receive electrical power from one or more of the one or more power distribution sources, convert the electrical power to a secondary form, and then the converted electrical power to the one or more loads within the respective power district. In embodiments, a logic module can be operatively connected to the one or more power districts, configured to control at least a load draw.

19 Claims, 2 Drawing Sheets

(51) Int. Cl.

| | |
|---|---|
| *B60L 50/64* | (2019.01) |
| *B60L 58/18* | (2019.01) |
| *B60W 10/08* | (2006.01) |
| *B61C 3/00* | (2006.01) |
| *H02J 3/14* | (2006.01) |
| *H02J 3/32* | (2006.01) |
| *H02J 4/00* | (2006.01) |

(52) U.S. Cl.
CPC .................. *B61C 3/00* (2013.01); *H02J 3/14* (2013.01); *H02J 3/322* (2020.01); *H02J 4/00* (2013.01); *H02J 2310/48* (2020.01)

(58) Field of Classification Search
USPC ............................................ 320/109; 701/22
See application file for complete search history.

(56) References Cited

U.S. PATENT DOCUMENTS

2007/0283713 A1    12/2007  Masselus
2014/0265942 A1*    9/2014  Li .............................. H02P 5/74
                                                318/51
2019/0305562 A1    10/2019  Begino, III et al.

OTHER PUBLICATIONS

U.S. Department of Transportation, Federal Railroad Administration, "Feasibility of Loan Shedding to Improve Efficiency and Reduce Energy Consumption on Passenger Locomotives, Phase I," Jul. 220, 36 pages.
European Search Report dated Jan. 17, 2025 in connection with European Patent Application No. 24191573.5, 7 pages.
Schonberger, "Distributed Control of a Nanogrid Using DC Bus Signalling," Doctor of Philosopy Thesis, Electrical and Electronic Engineering at the University of Canterbury, Christchurch, New Zealand, May 2005, 94 pages.
Srivastava, et al., "Optimization of Hybrid Renewable Resources using HOMER," International Journal of Renewable Energy Research, vol. 6, No. 1, 2016, 7 pages.
European Search Report dated Apr. 23, 2024 in connection with European Patent Application No. 23191465.6, 9 pages.

* cited by examiner

POWER DISTRICT ARCHITECTURE FOR A VEHICLE

TECHNICAL FIELD

The present disclosure relates to power district architecture, and more particularly to power district architectures for vehicles.

BACKGROUND

Managing which sources of power feed various loads in a micro-grid environment, such as an aircraft or an encapsulated railway, can often become very complex. For example, some loads may have varying criticality depending upon phase of operation, some loads may require different types and levels of power, some loads may favor certain power sourcing for fault segregation, while others may require dual or triple simultaneous sourcing.

Typically, systems may utilize software to monitor the power system and control the linkage between power sources and loads, however in some cases, this can be highly complex, hard to maintain, and very expensive to certify. In certain instances, only a single power converter is used for a given district, which requires precise prioritization of power distribution. Furthermore, incorporating additional power structures within the power distribution architecture, such as motor drives in rail applications, requires additional considerations when designing a power district.

Therefore, there remains a need in the art for improvements to power distribution architecture in rail applications. This disclosure provides a solution for this need.

SUMMARY

In accordance with at least one aspect of this disclosure, a power system for a vehicle includes one or more power distribution sources configured to supply electrical power to one or more power districts. One or more power conversion devices can be housed within a respective one or more power district. The power districts are configured to receive electrical power from one or more of the one or more power distribution sources, convert the electrical power to a secondary form, and supply the converted electrical power to one or more loads within the respective power district. A logic module is operatively connected to the one or more power districts and including machine readable instructions and can be configured to determine a system condition of the power system, prioritize each of the one or more loads, and control power delivery from each of the one or more power districts to the respective one or more loads based at least in part on the priority of the load.

In embodiments, the logic module can be configured to prioritize respective load draw based on the determined system condition, a mission profile phase, and/or a budgeted designated current for each of the respective one or more loads. In embodiments, the one or more power districts can include at least a first power district and at least a second power district electrically coupled via a bus tie. In certain embodiments, the determined system condition can include a power failure in the first power district, wherein during the power failure, the logic module is configured to control the bus tie to serve as a cross tie such that the second power district is configured to supply power to the first power district during the power failure.

In embodiments at least one of the one or more power conversion devices can include a DC/DC converter, configured to receive high voltage DC power, convert the high voltage DC power to low voltage DC power, and supply the low voltage DC power to one or more of the one or more loads, wherein the secondary form includes a lower voltage DC power than received by the at least one of the one or more power conversion devices. In such embodiments, the at least one of the one or more loads can include, a solid state power controller module, a lighting system, a lavatory, an infotainment system, and/or a seating system.

In certain embodiments, at least one of the one or more power conversion devices can include an environmental control system drive, configured to receive high voltage DC power, convert the high voltage DC power to an AC wave form, and supply the wave form to one or more of the one or more loads, wherein the secondary form includes the wave form. In such embodiments, at least one load of the one or more loads can include a compressor motor drive for an environmental control system.

In certain embodiments, at least one of the one or more power conversion devices can include a traction system drive, configured to receive high voltage DC power, convert the high voltage DC power to an AC wave form, and supply the wave form to one or more of the one or more loads, wherein the secondary form includes the wave form. In such embodiments, at least one load of the one or more loads can include an electric motor drive for a traction control system.

In embodiments, the system can include one or more batteries operatively connected to a respective power district via a bus tie configured to supply electrical power to one or more loads and configured to store electrical power supplied by the respective power district.

In certain embodiments, the controller can be further configured to output power district data to a main vehicle controller. In such embodiments, the power district data can include one or more of, a status and health of the one or more power conversion devices, a status and health of the one or more loads, a power status of the one or more loads, and/or a solid state power controller status for one or more connected loads. The controller can be configured to provide the power district data to the main vehicle controller via a digital data bus.

In certain embodiments, the vehicle can include an evacuated tube vehicle. In certain embodiments, the evacuated tube vehicle can include an evacuated tube electric train.

In accordance with at least one aspect of this disclosure, a modular power distribution architecture can include a power district having a plurality of power converters configured to power one or more loads within the power district, and where each power converter is sized to provide less than peak power to its respective load alone.

In embodiments, the plurality of power converters can include at least one DC/DC power converter connected in parallel, and a combined total output of the at least one DC/DC power converters can be sized to provide sufficient power to a first load type based on a mission profile load draw priority scheme for the first load type.

In embodiments, the plurality of power converters can include at least one compressor motor drive connected in parallel, and a combined total output of the at least one motor drive can be sized to provide sufficient power to a second load type based on the mission profile load draw priority scheme for the second load type.

In embodiments, the plurality of power converters can include at least one traction drive connected in parallel, and a combined total output of the at least one traction drive can be sized to provide sufficient power to a third load type based on the mission profile load draw priority scheme for the third load type.

In certain embodiments, the first load type can include at least one of a lighting system, a lavatory, an infotainment system, and/or a seating system. In certain embodiments, the second load type can include a compressor motor drive for an environmental control system. In certain embodiments, the third load type can include an electric motor drive for a traction control system.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
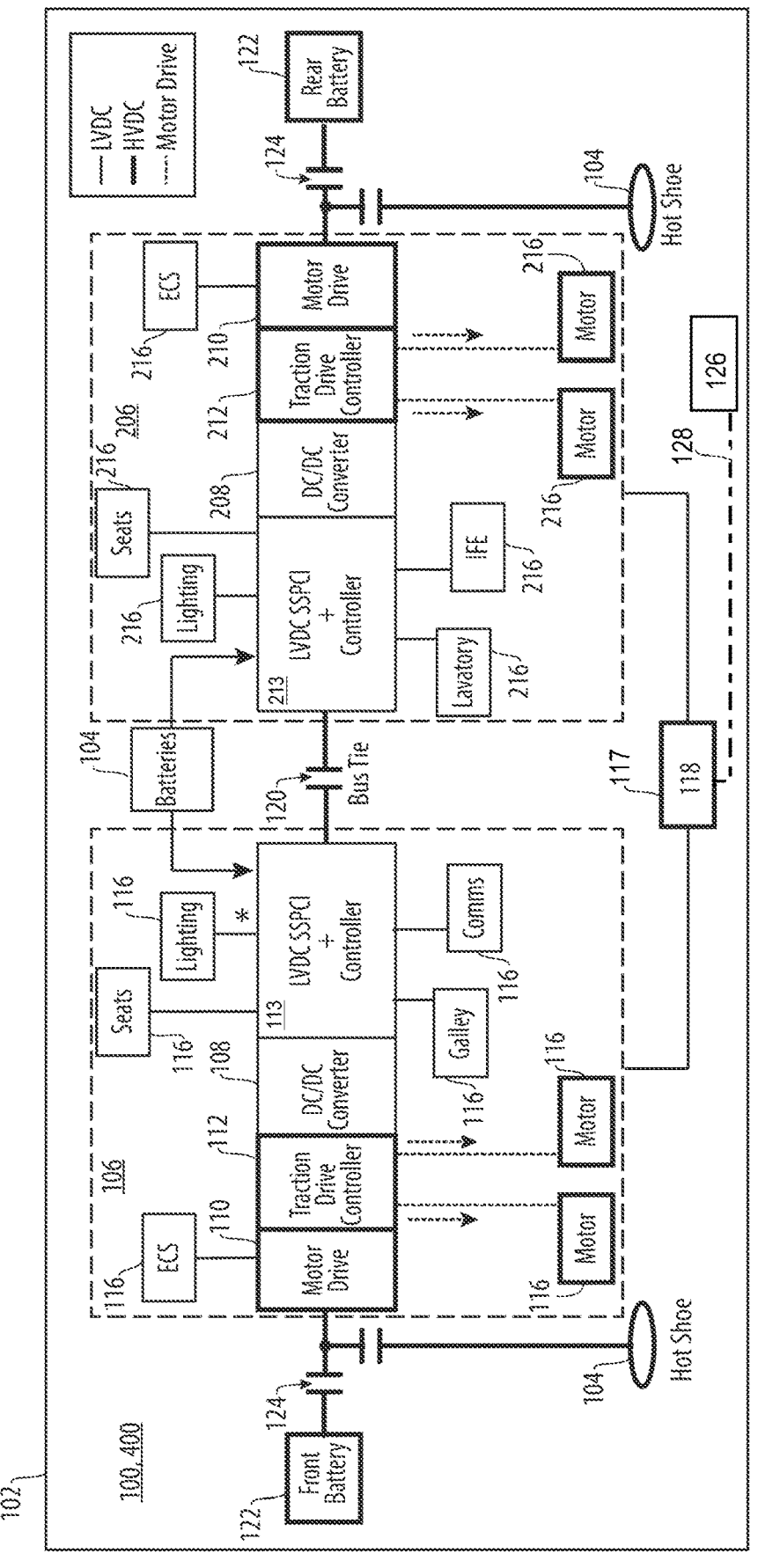
FIG. 1 is a schematic diagram of a power system for a vehicle in accordance with this disclosure, showing a power distribution architecture.
Figure 2:
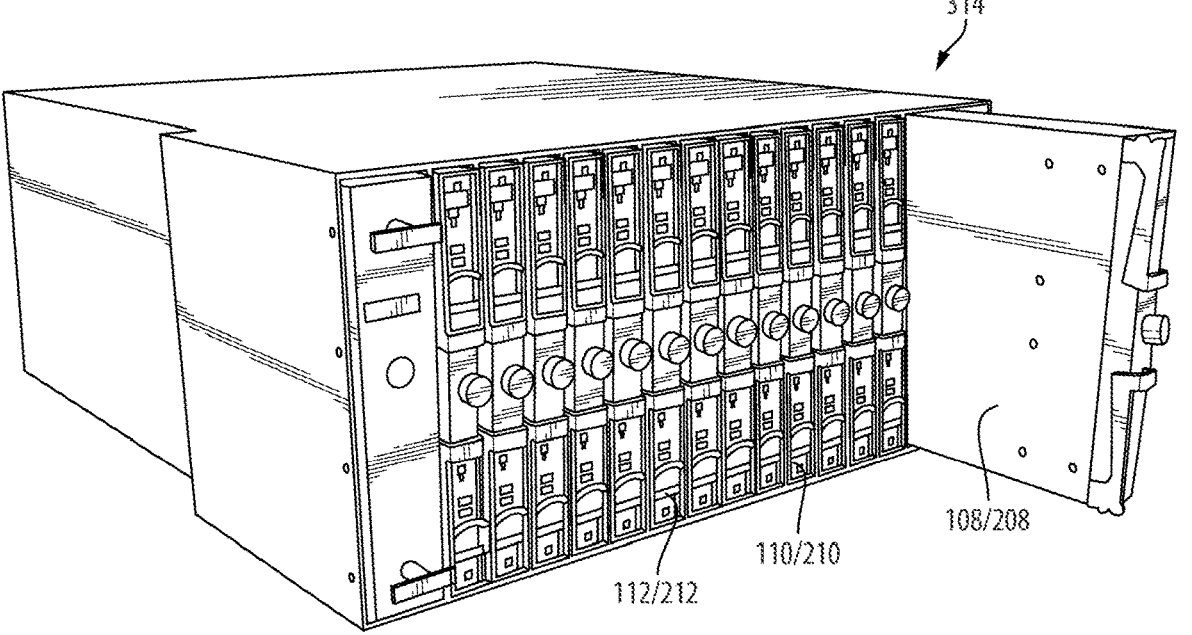
FIG. 2 is a perspective view of a rack-based power system of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments or aspects of the disclosure are shown in FIG. 2

In accordance with at least one aspect of this disclosure, a power system 100 for a vehicle 102 is disclosed. In embodiments, the vehicle 102 can be an evacuated tube vehicle, such as an evacuated tube electric train. The system 100 architecture provided herein can however be readily applied to other applications that experience pressure changes, such as aircraft, by one of ordinary skill in the art having the benefit of this disclosure without undue experimentation.

The system 100 can include, one or more power distribution sources 104 and one or more batteries 122 configured to supply electrical power to one or more power districts 106, 206. One or more power conversion devices 108/208 110/210, 112/212 can be housed within a respective power district 106, 206. The one or more power conversion devices 108/208 110/210, 112/212 can include a power blade or similar device, which can be included in a rack 314 based system (e.g., such as shown in FIG. 2). In embodiments, the power district 106, 206 can be configured to allow for managing a draw by a respective one or more loads 116/216 within the respective power district 106/206. The one or more power conversion devices 108/208 110/210, 112/212 can be configured to receive electrical power from one or more of the one or more power distribution sources 104 or one or more of one or more batteries 122, convert the electrical power to a secondary form, and then deliver the converted electrical power to the one or more loads 116/216 within the respective power district 106, 206.

In embodiments, a controller 117, having logic module 118, can be operatively connected to the one or more power districts 106/206, configured to control at least a load draw. The logic module 118 can include machine readable instructions configured to, at least, determine a system condition of the power system 100, prioritize each of the one or more loads 116/216 (e.g., within the respective districts, as well as across districts), and control power delivery from each of the one or more power districts 106/206 to the respective loads 116/216 based at least in part on the priority of the load. For example, each load within a district 106/206 may be given a predetermined priority for a given system condition. The logic module 118 is configured to control power delivery to each load in order of their priority given the determined system condition. More specifically, certain loads may have a medium or high priority during normal operation, but may have a low priority during a system failure. During the normal operation, such loads would receive power first, over lower priority loads, based on a total power budget. The power is delivered to each load in order of priority until the budget runs out. But during a system failure, those medium to high priority loads may be reclassified as low priority loads, and will not receive power until the new high priority loads have received sufficient power and if there is still power left in the budget.

In embodiments, the logic module 118 can be configured to prioritize respective load 116 and its allotted draw based on any one or more of the determined system condition (e.g., near total system failure, one power district failure, one power converter failure, and the like), a mission profile phase (e.g., start up, cruise, idle), and/or a budgeted designated current for each of the respective one or more loads.

While only a single local system controller 117 is shown, it is contemplated that in certain embodiments, any suitable number of controllers can be included, e.g., for redundancy. In certain applications, a single controller 117 for the vehicle is acceptable. In certain application, one or more controllers (e.g., the same or similar to controller 117) may be required to ensure the described systems are able to operate if a there is a controller failure. In such embodiments, the one or more redundant controllers can be arranged in any suitable manner to determine priority and address any conflicting commands between the controllers (e.g., the one or more controller can operate in a master/master, master/standby, majority voting, scheme, or the like).

In certain embodiments, the one or more power districts 106/206 include at least a first power district 106 and at least a second power district 206 are electrically coupled via a bus tie 120. As shown in the schematic of FIG. 1, the first power district can be represented by a first channel and the second power district can be represented by a second channel. The logic module 118 and the bus tie 120 can be operatively connected to each other and the respective first and second power districts 106/206 such that when the determined system condition includes a power failure in the first power district 106, the logic module 118 can be configured to control the bus tie 120 to serve as a cross tie such that the second power district 206 is configured to supply power to the first power district 106 during the power failure (e.g., with any available idle power blade in the second power district). The same can be true for a failure in the second power district 206, where the first power district 106 can supply power to the second power district 206 as needed during the failure. In this system condition, the priority of the loads would be reclassified based on only on their priority within their respective power districts, but also across the first and second districts. For example, if there is a power failure in the first power district 106, a medium priority load in the second power district 206 may be reclassified as a low priority load, and its budgeted power allocation could be redirected to high priority loads in the first power district 106 as needed during the power failure.

In certain embodiments, at least one of the one or more power conversion devices 108/208 110/210, 112/212 can include a DC/DC converter 108/208. The DC/DC converter 108/208 can be configured to receive high voltage DC power (e.g., at least about 350V), convert the high voltage DC power to low voltage DC power (e.g., about 28 Vdc), and supply the low voltage DC power to the one or more loads 116/216 based on the priority scheme outlined above. Here, the secondary form includes a lower voltage DC power than the high voltage received by the power converter 108/208. In such embodiments, at least one of the loads 116/216 can include, an SSPC module, a lighting system, a lavatory, an infotainment system, a seating system, a galley, a communications module, and/or the like.

In certain embodiments, at least one of the one or more power conversion devices 108/208 110/210, 112/212 can include a motor drive 110/210. The motor drive 110/210 can be configured to receive high voltage DC power (e.g., at least about 350V), convert the high voltage DC power to AC variable-voltage variable-frequency wave form, and supply the wave form to one or more of the one or more loads 116/216 based on the priority scheme outlined above. In such embodiments, at least one load of the one or more loads 116/216 can include compressor motor drive of an environmental control system (ECS), or a vehicle traction drive control system.

In certain embodiments, at least one of the one or more power conversion devices 108/208 110/210, 112/212 can include a traction drive 112/212. The traction drive 112/212 can be configured to receive high voltage DC power (e.g., at least about 350V), convert the high voltage DC power to AC variable-voltage variable-frequency wave form, and supply the wave form to one or more of the one or more loads. In such embodiments, at least one load of the one or more loads can include an electric motor.

In certain embodiments, there may be more loads 116/216 than power conversion devices 108/208 110/210, 112/212. One or more power solid state power controller (SSPC) modules 113/213 can be housed within a respective power district 106/206 configured to route power from a power conversion device 108/208, 110/210, 112/212 to multiple loads 116/216. The SSPC module 113/213 can be operatively commanded to provide power or remove power to or from certain loads 116/216. In embodiments, the SSPC module 113/213 can be designed to detect failures, including but not limited to overcurrents, short circuits, and arcing faults, and remove power from failed loads or wires.

In embodiments, the system 100 can include one or more batteries 122 operatively connected to a respective power district 106/206 via another bus 124 tie configured to supply electrical power to one or more loads (e.g., serving as a power distribution source) and/or configured to source the stored electrical power supplied to the respective power district 106/206. In certain embodiments, the power distribution source can include a hot shoe 104, if the vehicle includes a train traveling on electrified rail. In such embodiments, the one or more batteries 122 can be charged by the hot shoe 104 or by one or more external, off board power sources. In certain embodiments, the power districts 106/206 can be supplied power from a fuel cell or turbogenerator or any other suitable power generator. In certain embodiments, the fuel cell, turbogenerator, or other generator can be configured to charge the batteries 122, which can then supply the power to the power districts 106/206.

In certain embodiments, the controller 117 can be further configured to output power district data to a main vehicle controller 126 (e.g., a higher level main system controller). The power district data can include, for example, a status and health of the one or more power conversion devices 108/208 110/210, 112/212, a status and health of the one or more loads 116/216, a power status (e.g., DC power status) of the one or more loads 116/216, and/or an SSPC status for one or more connected loads 116/216 connected to a respective SSPC module 113/213. The controller 117 can be operatively connected to the high-level main vehicle controller 126 and configured to provide the power district data to the main vehicle controller 126 via a digital data bus 128.

In accordance with at least one aspect of this disclosure, a modular power distribution architecture 400 can include a power district (e.g., districts 106/206) having a plurality of power converters (e.g., converters 108/208 110/210, 112/212) configured to power one or more loads (e.g., loads 116/216) within the power district. Each power converter can be sized to provide less than peak power to its respective load alone. For example, if the power district requires 100 kW of power during peak, each individual power converter can be sized to provide less than 100 kW of power alone. In embodiments, the architecture can include any one or all of the power converters 108/208 110/210, 112/212 and SSPC modules 113/213 discussed above connected in any suitable manner. For example, in certain embodiments, the architecture 400 can include a DC/DC power converter 108/208, a motor drive 110/210, a traction drive 112/212, and an SSPC module 113/213.

In certain embodiments each of the DC/DC power converter, a motor drive, and a traction drive can include submodules connected in parallel. For example, the DC/DC power converter can include at two DC/DC power converters connected in parallel. Here, the combined total output of the two DC/DC power converters is sized to provide sufficient power to a first load type based on a mission profile load draw priority scheme for the first load type. In this example, because there are two submodules, each submodule can be sized for half of the power requirement for the first load type at the given mission phase. However, each submodule need not be equally sized. In embodiments, the first load type can include at least one of a lighting system, a lavatory, an infotainment system, and/or a seating system.

Similarly, each of the motor drive and traction drive can include at least two respective submodules connected in parallel, where the combined total output of the respective submodules is sized to provide sufficient power to a second load type based on the mission profile load draw priority scheme for a second load type and a third load type respectively. The second load type can include compressor motor drive for an environmental control system and the third load type can include traction control system.

Though shown in FIG. 2 as a cabinet type chassis, or rack-based system, any suitable configuration of power conversion devices within districts is contemplated herein. For example, in certain embodiments, the power districts and conversion devices can be configured to the cluster of functionality that performs power conversion (e.g., including motor drive waveforms and standard ac/DC waveforms), and power distribution including functions like source selection and load management. In embodiments, the actual packaging of the various elements within the power districts may vary due to installation constraints, therefore the rack-based system shown in FIG. 2 may not be used for every application or vehicle. For example, the motor controllers may be packaged with the DC/DC power converters, and the power distribution modules may be packaged with general purpose computing. Each power district can be fed by one-to-many primary power feeds depending upon the needs of the loads, for example. In embodiments, a one power district per rack is not required or desired, thus any suitable packaging arrangement is contemplated herein.

Embodiments include a modular power conversion and control architecture. Embodiments allow for simple scalability, for example for higher power systems with parallelable commoditized power blades, or for smaller, lower power systems. Scalable systems can be more cost effective in certain applications such as rail. Embodiments can include highly integrated systems that provide high power density and efficiency, as well as more efficient use of resources (e.g. the power conversion blades, micro-controller blades, etc). For example, in embodiments certain power converter blades/modules can multiplex between applications, such as the ECS motor drive and the traction drive. In embodiments, it may not be necessary to provide power to both the motor drive and traction drive at the same time, so it may be more efficient to size the converters to provide less than peak power. Then, when the motor drive is needed, the converter for both the motor drive and traction drive can provide a total combined output to supply peak power to the motor drive when needed. The same can be true for the traction drive. One having ordinary skill in the art in view of this disclosure would appreciate a base power needed to complement a multiplexed system for a given power requirement.

Embodiments do not require highly specific, dedicated parts or specific wattage parts. Instead, embodiments can include the power districts as provided herein having one or more of the power conversion devices chosen and sized for a predetermined power requirement or for a given mission profile. This allows for the systems and architecture provided herein to be more cost effective and transferrable to many mission profiles, power requirements, or applications.

Embodiments can include multiple modular and reconfigurable controllers for driving multiple different loads, embedded SiC power semiconductor and Si Solid State Power Controller (SSPC) technology for both high voltage and low voltage DC, multiplexing and protection capabilities, EMC and filtering, and health management of the controllers via re-configurability.

Embodiments provide for improved maintainability, repair, and replacement (e.g., it is physically easier to access motor drives if in a rack-based system such as described herein). Further, embodiments can reduce overall power system weight (e.g. about 40% weight reduction over traditional systems), can reduce costs (e.g., by including a common motor drive design for all motor-driven load types).

Such embodiments can include a 350 to 28V DC/DC converter, a 350 VDC to 3-phase/115 VAC motor drive, and an SSPC (solid state power controller). In embodiments, the DC/DC converter can include modular, parallelable 3 to 5 kW circuit cards. In embodiments, the motor controller (e.g., for powering and control of ECS and traction control systems) can include modular, parallelable 5 to 10 kW cards. Embodiments can include 28 Vdc SSPC's. Embodiments allow for standardized part numbers for each modular function and for long term optimization as a commoditized item for certain cost-sensitive applications. While specific voltages and power levels are provided herein for explanation, any suitable voltage and/or power levels may be used as needed or desired for a given application.

As will be appreciated by those skilled in the art, aspects of the present disclosure may be embodied as a system, architecture, method, module, or product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "controller," or "system." A "circuit," "module," "controller," or "system" can include one or more portions of one or more separate physical hardware and/or software components that can together perform the disclosed function of the "circuit," "module," "controller," or "system", or a "circuit," "controller," "module," or "system" can be a single self-contained unit (e.g., of hardware and/or software). Furthermore, aspects of this disclosure may take the form of a computer program product embodied in one or more computer readable medium(s) having computer readable program code embodied thereon.

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A power system for a vehicle comprising:
one or more power distribution sources configured to supply electrical power to one or more power districts;
one or more power conversion devices each housed within a respective one of the one or more power districts and configured to receive electrical power from at least one of the one or more power distribution sources, convert the electrical power to a secondary form, and supply the converted electrical power to one or more loads within the respective power district; and
a logic module operatively connected to the one or more power districts and including machine readable instructions configured to:
determine a system condition of the power system;
prioritize each of the one or more loads;
prioritize respective load draw based on the determined system condition, a mission profile phase, and/or a budgeted designated current for each of the respective one or more loads; and
control power delivery from each of the one or more power districts to the respective one or more loads based at least in part on the priority of each of the respective one or more loads;
wherein the one or more power districts include at least a first power district and at least a second power district electrically coupled via a bus tie;
wherein the determined system condition includes a power failure in the first power district; and
wherein, during the power failure, the logic module is configured to control the bus tie to serve as a cross tie such that the second power district is configured to supply power to the first power district.

2. The system of claim 1, wherein at least one of the one or more power conversion devices includes a DC/DC converter configured to receive high voltage DC power, convert the high voltage DC power to low voltage DC power, and supply the low voltage DC power to one or more of the one or more loads, and wherein the secondary form includes a lower voltage DC power than received by the at least one of the one or more power conversion devices.

3. The system of claim 2, wherein at least one of the one or more loads includes a solid state power controller module, a lighting system, a lavatory, an infotainment system, a galley, a communications module, and/or a seating system.

4. The system of claim 1, wherein at least one of the one or more power conversion devices includes an environmental control system drive configured to receive high voltage DC power, convert the high voltage DC power to an AC wave form, and supply the AC wave form to one or more of the one or more loads, wherein the secondary form includes the AC wave form.

5. The system of claim 4, wherein at least one load of the one or more loads includes a compressor motor drive for an environmental control system.

6. The system of claim 1, wherein at least one of the one or more power conversion devices includes a traction system drive configured to receive high voltage DC power, convert the high voltage DC power to an AC wave form, and supply the AC wave form to one or more of the one or more loads, wherein the secondary form includes the AC wave form.

7. The system of claim 6, wherein at least one load of the one or more loads includes an electric motor drive for a traction control system.

8. The system of claim 1, further comprising one or more batteries operatively connected to a respective power district via a second bus tie and configured to supply electrical power to the respective one or more loads and to store electrical power supplied by the respective power district.

9. The system of claim 1, wherein the logic module is further configured to output power district data to a main vehicle controller.

10. The system of claim 9, wherein the power district data includes one or more of: a status and health of the one or more power conversion devices, a status and health of the one or more loads, a power status of the one or more loads, and/or a solid state power controller status for one or more connected loads, wherein the logic module is configured to provide the power district data to the main vehicle controller via a digital data bus.

11. The system of claim 1, wherein the vehicle includes an evacuated tube vehicle.

12. The system of claim 11, wherein the evacuated tube vehicle includes an evacuated tube electric train.

13. The system of claim 1, wherein each power conversion device is sized to provide less than peak power to the respective one or more loads.

14. The system of claim 13, wherein the one or more power conversion devices include one or more DC/DC power converters having a combined total output sized to provide sufficient power to a first load type based on a mission profile load draw priority scheme for the first load type.

15. The system of claim 14, wherein the one or more power conversion devices include one or more compressor motor drives having a combined total output sized to provide sufficient power to a second load type based on a mission profile load draw priority scheme for the second load type.

16. The system of claim 15, wherein the one or more power conversion devices include one or more traction drives having a combined total output sized to provide sufficient power to a third load type based on a mission profile load draw priority scheme for the third load type.

17. A power system for a vehicle comprising:
one or more power distribution sources configured to supply electrical power to one or more power districts;

one or more power conversion devices each housed within a respective one of the one or more power districts and configured to receive electrical power from at least one of the one or more power distribution sources, convert the electrical power to a secondary form, and supply the converted electrical power to one or more loads within the respective power district; and a logic module operatively connected to the one or more power districts and including machine readable instructions configured to:

determine a system condition of the power system;

prioritize each of the one or more loads; and control power delivery from each of the one or more power districts to the respective one or more loads based at least in part on the priority of each of the respective one or more loads;

wherein each power conversion device is sized to provide less than peak power to the respective one or more loads;

wherein the one or more power conversion devices include one or more DC/DC power converters having a combined total output sized to provide sufficient power to a first load type based on a mission profile load draw priority scheme for the first load type;

wherein the one or more power conversion devices include one or more compressor motor drives having a combined total output sized to provide sufficient power to a second load type based on a mission profile load draw priority scheme for the second load type;

wherein the one or more power conversion devices include one or more traction drives having a combined total output sized to provide sufficient power to a third load type based on a mission profile load draw priority scheme for the third load type;

wherein the first load type includes a lighting system, a lavatory, an infotainment system, and/or a seating system;

wherein the second load type includes an environmental control system; and wherein the third load type includes a traction control system.

18. The system of claim 17, wherein the one or more power districts include at least a first power district and at least a second power district electrically coupled via a bus tie.

19. The system of claim 18, wherein:

the determined system condition includes a power failure in the first power district; and during the power failure, the logic module is configured to control the bus tie to serve as a cross tie such that the second power district is configured to supply power to the first power district.

* * * * *